(12) United States Patent
Sedlar et al.

(10) Patent No.: US 12,516,735 B2
(45) Date of Patent: Jan. 6, 2026

(54) PTFE SHAFT SEAL AND METHOD OF MAKING

(71) Applicant: TENNECO INC., Northville, MI (US)

(72) Inventors: Brent Ryan Sedlar, Dexter, MI (US); Eugene David Zelinsky, Ypsilanti, MI (US); Marcie Noteboom, Armada, MI (US)

(73) Assignee: Federal-Mogul Powertrain LLC, Northville, MI (US)

( * ) Notice: Subject to any disclaimer, the term of this patent is extended or adjusted under 35 U.S.C. 154(b) by 0 days.

(21) Appl. No.: 18/178,084

(22) Filed: Mar. 3, 2023

(65) Prior Publication Data

US 2024/0295268 A1  Sep. 5, 2024

(51) Int. Cl.
  *F16J 15/32* (2016.01)
  *F16J 15/3244* (2016.01)
  *F16J 15/328* (2016.01)
  *F16J 15/3284* (2016.01)

(52) U.S. Cl.
  CPC ......... *F16J 15/3244* (2013.01); *F16J 15/328* (2013.01); *F16J 15/3284* (2013.01)

(58) Field of Classification Search
  CPC .... F16J 15/3244; F16J 15/328; F16J 15/3284; B60J 10/21
  See application file for complete search history.

(56) References Cited

U.S. PATENT DOCUMENTS

| | | | |
|---|---|---|---|
| 4,568,092 A | 2/1986 | Hayashida et al. | |
| 6,336,638 B1 * | 1/2002 | Guth | F16J 15/3228 277/560 |
| 6,513,810 B1 * | 2/2003 | Pataille | F16J 15/3228 277/944 |
| 6,715,768 B1 * | 4/2004 | Bock | F16J 15/3244 277/549 |
| 6,945,537 B2 | 9/2005 | Guillerme et al. | |
| 8,313,106 B2 | 11/2012 | Nok | |
| 8,485,533 B2 | 7/2013 | Nok | |
| 8,505,926 B2 * | 8/2013 | Toth | F16J 15/025 277/569 |
| 8,590,903 B2 | 11/2013 | Nok | |
| 9,488,278 B2 | 11/2016 | Nosenzo et al. | |
| 9,714,710 B2 | 7/2017 | Fei et al. | |

FOREIGN PATENT DOCUMENTS

| | | | |
|---|---|---|---|
| CA | 2008050 A1 | 7/1990 | |
| DE | 102017006528 A1 | 1/2019 | |
| EP | 1197690 A1 * | 4/2002 | ........... F16J 15/3228 |
| KR | 102305290 B1 | 9/2021 | |

* cited by examiner

*Primary Examiner* — Christine M Mills
*Assistant Examiner* — L. Susmitha Koneru
(74) *Attorney, Agent, or Firm* — Dickinson Wright PLLC

(57) ABSTRACT

A PTFE rotary shaft seal assembly includes an annular seal case mountable within a bore of a housing and a wafer fabricated of PTFE. An outer region of the wafer is captured by the seal case and in inner region extends to a central opening of the wafer. The wafer includes coined fluid pumping impressions formed on a first side of the wafer and coined flexing impressions formed on an opposite second side of the wafer. The wafer further includes a coined static band portion encircling the central opening and being free of fluid pumping impressions. A method of making such a wager and seal assembly is also provided.

12 Claims, 5 Drawing Sheets

PTFE SHAFT SEAL AND METHOD OF MAKING

BACKGROUND

1. Technical Field

This invention relates generally to dynamic PTFE shaft seals and more particularly to the construction and making of PTFE shaft seals.

2. Related Art

Dynamic shaft seals are often used to seal an opening in a housing through which a rotating shaft extends. The seal interacts between the housing and shaft to prevent the escape of lubricant from the interior of the housing and often to exclude the ingress of dirt and debris from the housing.

One class of dynamic seals employs a wafer of PTFE material that is initially disc-shaped and clamped at its outer perimeter by a rigid seal hosing. The inner perimeter of the PTFE wafer is free and is caused to stretch and an inner running surface thereof caused to lay down against the shaft during installation of the seal about the shaft. The running surface of the PTFE wafer is sometimes shaped by cutting or coining to impart a groove pattern that operates in a dynamic mode to pump fluid from inner running surface back toward the housing. Cutting is a known technique wherein select wafer material is removed to create grooves in the wafer of a desired size, shape and pattern. Coining is also a known process in which the portion of the wafer to be coined is subjected to heavy and localized compressive loads which causes permanent deformation of the affected regions, wherein permanent indentations form the hydrodynamic groove features with corresponding raised or displaced regions being generated as a result of material displacement during coining. While shaped PTFE wafers have shown to work well in the dynamic mode, they may have difficulty sealing against the leakage of fluid in a static mode when the shaft is not rotating, as there is no dynamic pumping action when the shaft is idle. This is especially true in designs where the shaped features extend to the inner periphery of the running face. Efforts to increase the static sealing capabilities of shaft seals can be counterproductive to the performance of their dynamic sealing mode, as a return path for pumped fluid needs to remain open.

One aspect of the present disclosure aims to solve this problem by achieving a proper balance in design and function between the dynamic and static aspects of a shaft seal so that it performs well in both the dynamic mode and also the static mode to preclude the leakage of fluid under dynamic conditions while the shaft is rotating against the seal, and under static conditions while the shaft is stationary.

SUMMARY OF THE INVENTION

A PTFE rotary shaft seal assembly includes an annular seal case mountable within a bore of a housing and a wafer fabricated of PTFE with an outer region captured by the seal case and in inner region extending to a central opening of the wafer. The wafer includes coined fluid pumping impressions formed on a first side of the wafer and coined flexing impressions formed on an opposite second side of the wafer. The wafer further includes a coined static band portion encircling the central opening and being free of fluid pumping impressions.

The PTFE shaft seal with the coined pumping impressions provides improved dynamic scaling performance to the seal, while the coined static band provides improved static sealing about a shaft extending through a shaft opening in a case. More specifically, the static seal band is designed to fit close or tight enough about the shaft to preclude the leakage of fluid (e.g., oil) out of the case when the shaft is stationary, but cooperates with the coined pumping impressions when in the dynamic mode to enable any fluid that escapes in the dynamic mode to be pumped back into the case under the hydrodynamic influence of the impressions and to pass by the static band in the return direction.

A method of making a PTFE shaft seal assembly is also provided and includes preparing an annular wafer of PTFE material of uniform thickness having an outer region and an inner region and opposite first and second sides. The method further includes pressing and permanently deforming an inner portion of the wafer between opposing coining dies to impress a plurality of coined dynamic fluid impressions into the first side of the wafer, and to further coin a reduced-thickness static band that is free of fluid impressions and which encircles a central opening of the wafer. The method has the advantage of forming a PTFE wafer with both coined dynamic fluid pumping features and coined static sealing features. The coining of the static sealing band renders it thinner than the original pre-coined wafer thickness and enables it to provide a sufficient seal under to prevent leakage of oil past the sealing band under static conditions, while allowing oil to return to the oil side of the seal under dynamic conditions by passing under the static band.

THE DRAWINGS

These and other objects, advantages and features of the invention will become better understood when considered in light of the following detailed description and drawings, in which.

DETAILED DESCRIPTION

Figure 1:
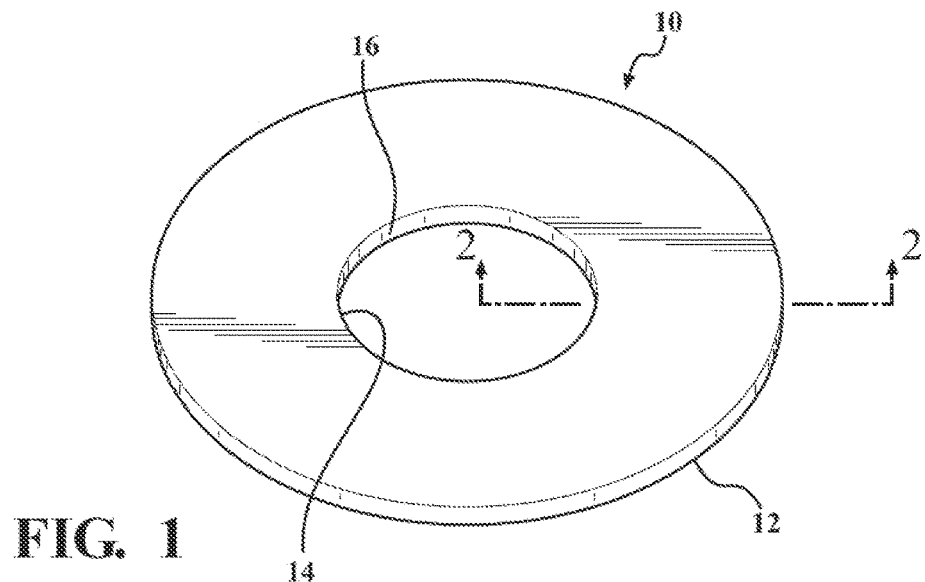
FIG. 1 is a front perspective view of a PTFE wafer preform.
Figure 2:
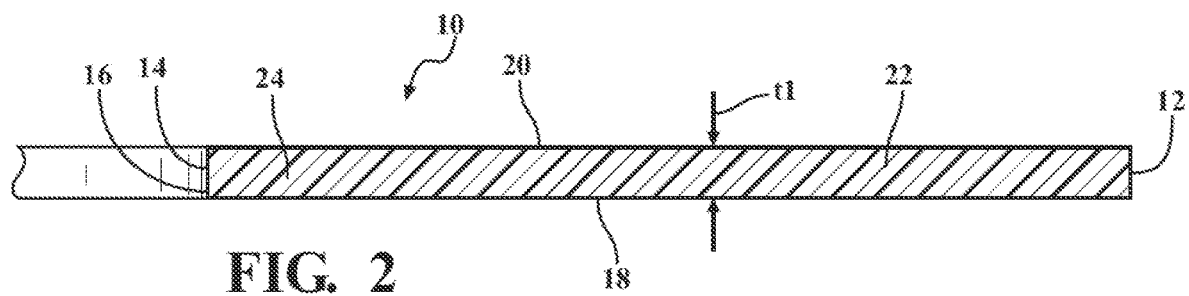
FIG. 2 is an enlarged cross-sectional view taken along lines 2-2 of FIG. 1.

FIGS. 1 and 2 illustrates an embodiment of a PTFE wafer preform 10, which may also be known as a washer, flat washer or disc. Its form may be planar and may be cut from a sheet of PTFE (polytetrafluoroethylene) material. It is shown here in a preform stage before any features are coined into its surfaces. The wafer 10 may have a generally cylindrical shape including an outer cylindrical surface 12 of predetermined diameter and an inner cylindrical surface 14 of a relatively smaller predetermined diameter. The inner and outer surfaces 12, 14 may be concentric. The inner cylindrical surface 14 defines a central hole or opening 16 through the wafer 16 and the size of the opening 16 may depend on the size of a shaft that is to be extended through the opening 16, as explained further below. The wafer 10 has a first or front side 18 and an opposite second or back side 20. In the illustrated preform stage of the wafer 10, the first and second sides 18, 20 are planar and parallel and define a predetermined uncoined thickness t1 of the wafer 10 that is initially uniform from the outer to the inner surfaces 12, 14, as can also be seen in FIG. 2. The thickness t1 may also be referred to as the original thickness or the uncoined thickness. The wafer 10 includes a radially outer region or portion 22 and a radially inner region or portion 24 and both portions 22, 24 initially have the same original thickness t1 in the preform wafer stage.

Figure 3:
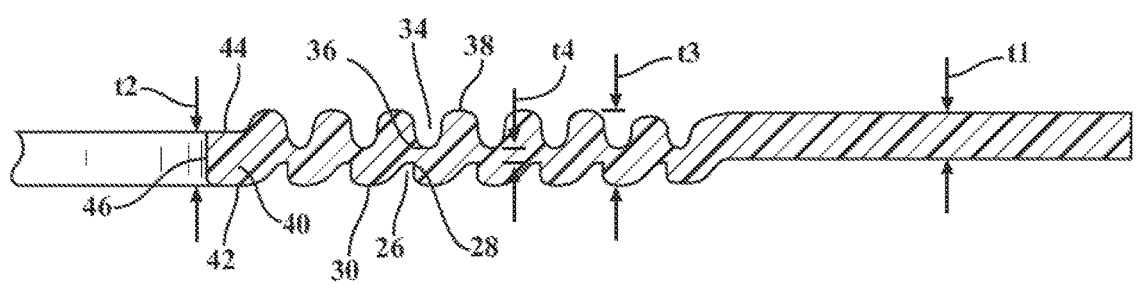
FIG. 3 is a view like FIG. 2 but of a coined PTFE wafer.

FIG. 3 illustrates an embodiment of the wafer 10 after it has been coined. The outer region 24 remains in its original, preform condition of FIGS. 1 and 2, meaning that it has not been coined and that it retains its original thickness t1. The inner region 22, on the other hand, has been coined and as a result has features which have been permanently impressed into the surfaces 12, 14 as a result of coined plastic deformation of the PTFE material in this region 22. These coined features are formed not by cutting or material removal, but by means of permanent material displacement through plastic deformation in a coining process. The coined features include fluid pumping channels, grooves or impressions 26 that have been impressed into the first side surface 18. Each groove 26 has angled side walls that extend from a base or valley 28 of the groove to the surface 18. The region between adjacent grooves 26 takes the form of peaks 30 which engage a shaft 32 in operation, as illustrated also in FIG. 4. It will be observed from a comparison of FIGS. 2 and 3 that the peaks 30 project below (i.e., are offset relative to) the first side surface 18 of the outer region 22. This results from the inner region 24 being coined to permanently displace a certain amount of inner region material below the original plane of first side surface 18. It will also be seen that the valleys 28 of the grooves 26 lie in or substantially in the same plane as the first side 18 of the uncoined outer region 22.

FIG. 3 also illustrates flexing channels, grooves or impressions 34 which are permanently impressed into the back side 20 of inner region 24 by coining, generally opposite the fluid pumping grooves 26. The flexing grooves 34 each have angled side walls that extend from a base of valley 36 of the groove 34 to the surface 20. The region between adjacent grooves 34 takes the form of peaks 38. It will be seen that the flexing grooves 34 on the back side 20 align opposite the peaks 30 on the front side 18. The material that is permanently displaced in coining the flexing grooves 34 is reflected in the offset peaks 30 formed on the front side 18 that project below the first side plane 18 of the outer region 22. In other words, the PTFE material that is permanently displaced in coining the indented flexing grooves 34 is accommodated at least in part through the displacement of material on the opposing side in formation of the offset peaks 30. However, the coining dies used in the coining process are preferably sized so that the peaks 30 themselves are coined and permanently compressed along at least part of their surfaces, with the excess PTFE material that would otherwise fill out the peaks 30 being displaced radially inwardly toward the inner diameter 14 of the wafer 10 during the coining process.

The embodiment of FIG. 3 further illustrates the formation of a coined static band 40 immediately adjacent and encircling the hole 16. The static seal band 40 is circumferentially continuous and is free of the fluid grooves 26 on its inner side 18. The inner surface of the static band is smooth and continuous and has no grooves or channels or other coined features that would allow the passage of a fluid, such as oil, when in a static operating condition, to be described further below. The coined static seal band 40 has a coined maximum thickness t2 that is less than the original thickness t1 of the preform wafer 10. The reduction in thickness results from squeezing and permanently deforming the radially inner-most region of the wafer 10, causing that region to become permanently thinner and permanently longer than it was in original pre-coined wafer form, as illustrated in the embodiment of the wafer preform 10 in FIGS. 1 and 2. A front side 42 of the seal band 40 is displaced downward (or offset) from the first side 18 of the non-coined outer region 2, and preferably lies in the same plane as the peaks 30. This permanent downward shifting or displacement of the front side 42 of the seal band 40 material occurs as a result of coining. An opposite back side 44 of the seal band 40 is permanently displaced below the back side 20 of the uncoined outer region 22 and likewise occurs as a result of coining. The seal band 40 is thus offset, thinner and longer in its coined form as compared to the uncoined preform stage of the wafer 10. The coined surfaces of the seal band 40 include the front side 42, the back side 44 and also an inner diameter surface 46 which now forms the hole 16, but with a reduced diameter due to the lengthening of the seal band 40 during coining. It will further be seen that the front side surface 42 of the coined static band 40 the valleys 28, 36 of the grooves 26, 34, respectively, and that the back side surface 44 lies above the valleys 28, 36 of the grooves 26, 34, respectively.

The coined inner region 24 has a peak-to-peak coined thickness t3 that is greater than the original thickness t1. The coined inner region 24 further has a valley-to-valley coined thickness t4 that is less than the original thickness t1 and also less than the coined thickness t2 of the static seal band 40. A central plane of the material that separates the valleys 28 from the valleys 36, having the thickness t4, is displaced relative to a central plane of the uncoined outer region 22.

The size and shape of the fluid pumping grooves 26 is preferably consistent among the grooves 26. The radially inner wall of the grooves 26 is preferably at a larger angle than an opposing radially outer wall of the grooves 26. The shape of the grooves may be saw-toothed, with the radially outer groove walls being steeper than the radially inner walls. The peaks 30 of the fluid pumping grooves 26 may have an inclined surface which rises toward the outer region 22, giving the peaks 30 also a saw-toothed configuration. The flexing grooves 34 may be deeper, wider and have a different size and shape than that of the fluid pumping grooves 26. The flexing grooves 34 may be rounded in their valleys 36 and rounded in their peaks 38. The flexing grooves 34 and their associated valleys 36 and peaks 38 may be uniform or may vary to control desired flexibility of the wafer 10 in operation. The depth of the pumping grooves 26 is less than the depth of the flexing grooves. The valley-to-valley spacing of the pumping grooves 26 is the same as the valley-to-valley spacing of the flexing grooves 34. The coined static band 40 is spaced from the nearest adjacent valley 36 of the flexing grooves 34 by an intervening valley 28 of the fluid grooves 26 and an intervening peak 38 of the flexing grooves 34.

Figure 4:
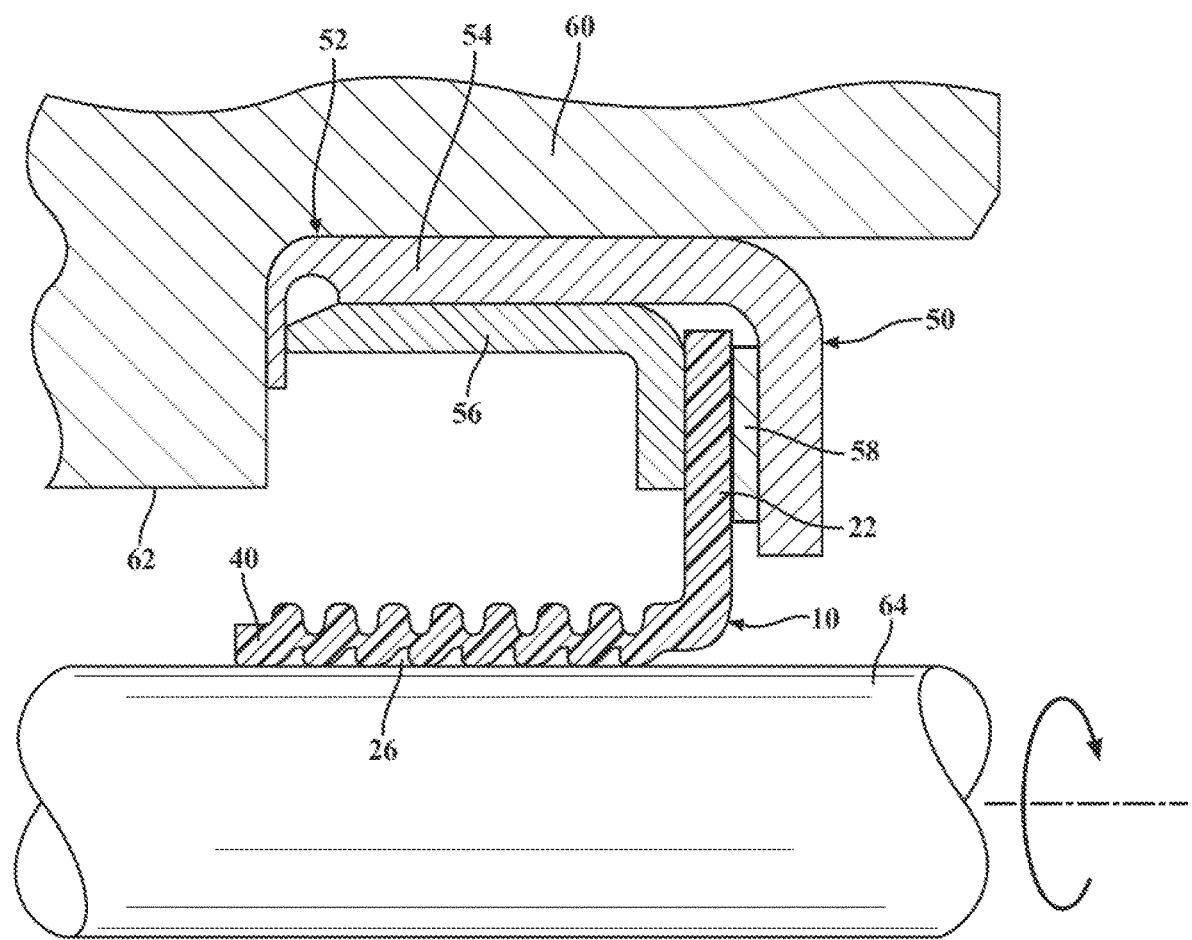
FIG. 4 is a fragmentary cross-sectional view of a PTFE seal assembly in use.

FIG. 4 schematically illustrates the coined wafer 10 forming part of a PTFE rotary shaft seal assembly 50. The assembly 50 includes a rigid annular seal case 52, which may be made by an annular outer case portion 54 and an annular inner case portion 56 in known fashion. The outer region 22 of the wafer is arranged between opposing annular radial flanges of the case portions 54, 56 and the case 52 is then deformed to clamp and capture the wafer 10 between the case portions 54, 56, with the inner region 24 of the PTFE wafer extending radially inwardly of the case 52 to its free annular opening 16. One way of achieving the mounting of the wafer 10 is to deform an axially inner lip of the outer case portion 54 onto the inner case portion 56 while axially compressing the portions 54, 46. An elastomeric gasket 58 may be provided between the wafer 10 and outer seal portion 54. The seal assembly 50 is mounted in a housing 60 to be sealed, with the case 52 pressed into an associated housing recess that surrounds a shaft opening 62. Fluid, such as lubricating oil, is contained internally within the housing 60 and the external environment is typically air. FIG. 4 is identified with "OIL" and "AIR" sides of the seal assembly 50, in use. A shaft 64 is extends through the shaft opening 62 and has an outer diameter running or sealing surface that is comparatively larger than the coined hole 16 of the wafer 10. The placement of the shaft 64 through the seal assembly 50 stretches the hole 16 of the wafer 10 elastically to tightly conform to the running surface of the shaft 64. The running surface may be the shaft itself, or may be a sleeve which may be part of the shaft 64 or part of the seal assembly 50. The elastic deformation of the wafer 10 causes the inner region 24 to take the form of a collar such that the front side 42 of the coined static seal band 40 and the front side of some or all of the coined fluid grooves 26 and their associated peaks 30 lie down against the shaft 64, with the inner region being bent and extending axially along the shaft 64 toward the oil side of the seal assembly 50.

In operation, the installed seal assembly 50 operates in both a static condition or mode and a dynamic condition or mode. When the shaft 64 is rotating, any oil from the housing 60 which may make its way past the static seal band 40 is received into the grooves 26 and the action of the rotating shaft 64 relative to the stationary grooves 26 sets up a dynamic pumping action which effectively drives the fluid back toward the oil side so it does not leak from the housing 60 through the shaft opening 62. It is not unusual for housings 60 to be under positive pressure when operational thus contributing to the tendency of the oil to be forced past the static band 40 and to be returned by the action of the fluid pumping grooves 26 in the dynamic mode. When the shaft 64 is stationary, there is no dynamic pumping action developed at the grooves 26. Sealing of the shaft opening 62 is dependent solely on the static sealing band 40. Since it is coined and is thinner, it allows oil to pass more easily in the dynamic mode by action of the grooves 26 which captures and dynamically returns the oil back to the housing 60 past the static seal band 40. Oftentimes static bands are made to be thick-walled to enhance their static sealing performance, but they must then be formed with grooves or some form of surface channels to enable the dynamic return of oil when in the dynamic mode. A different approach is taken here, wherein the coined static seal band 40 is free of any such surface grooves or oil passages features. The coining of the static seal band 40 without any extension of the grooves 26 enables the static seal band 40 to be circumferentially continuous and to form a 360 degree complete static seal about the shaft 64 when stationary to prevent the leakage of oil from the housing 60

Figure 5:
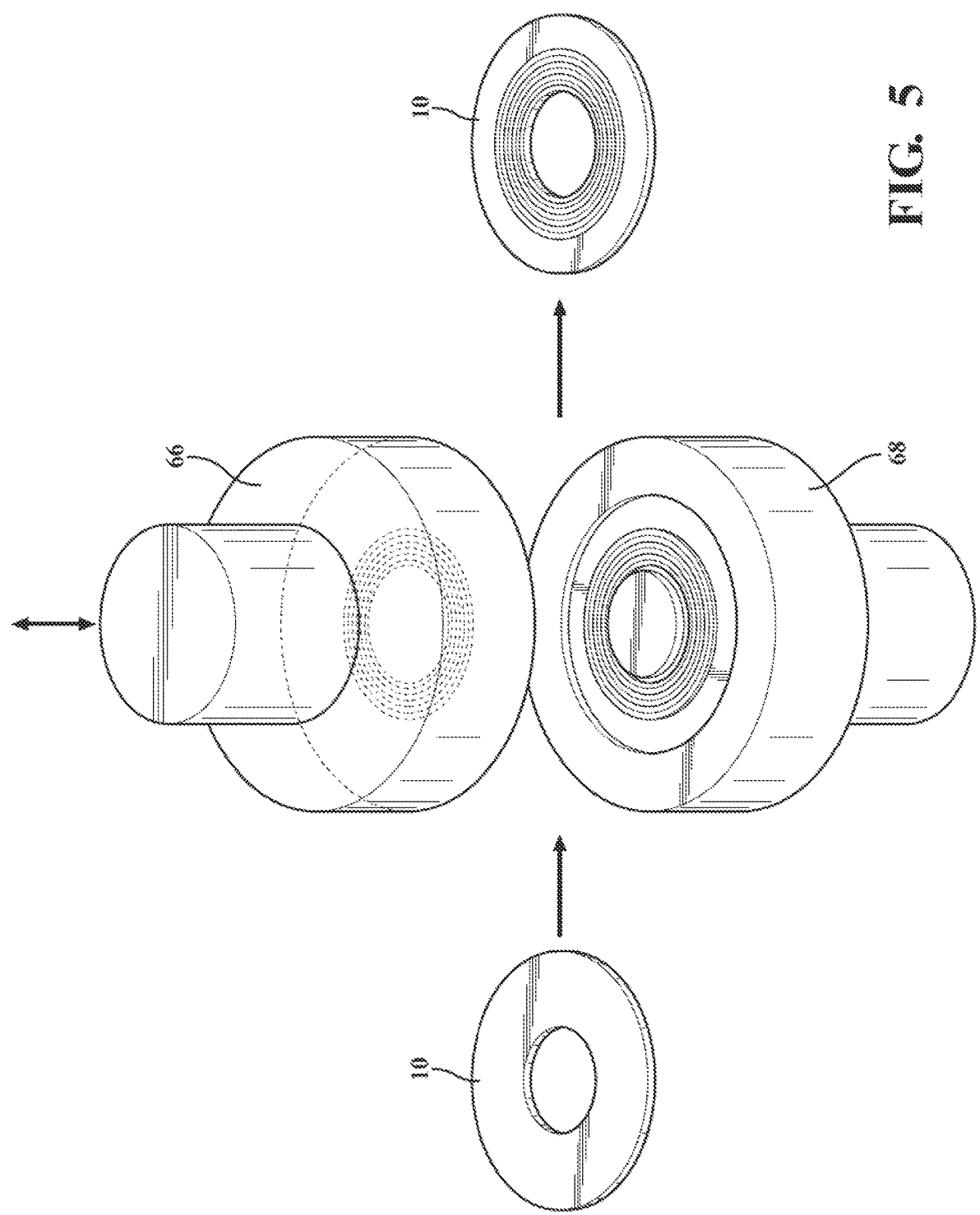
FIG. 5 is a schematic illustration of a PTFE coining process.
Figure 6A:
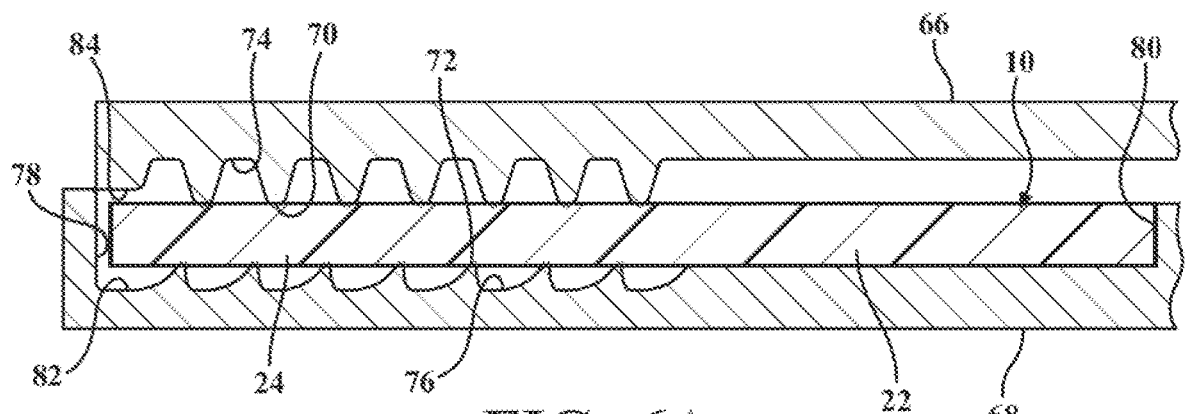
FIGS. 6A-6F are schematic illustrations showing stages of the wafer coining process.

FIGS. 5 and 6A-6F illustrate process steps for coining the above features into the radially inner portion 24 of the PTFE wafer preform 10, while not coining the radially outer portion 24 of the wafer preform. FIG. 5 schematically shows the general process steps whereby the uncoined wafer preform 10 is introduced between upper and lower coining dies 66, 68 which are actuated to forcibly close and coin impressions into the wafer 10, after which the completed coined wafer is removed. FIG. 6A illustrates further details of the embodiment of the upper coining die 66 and the lower coining die 68 arranged opposite one another. It will be understood that one or both of the dies 66, 68 are controlled by a suitable die press which acts to move the dies forcibly toward one another to impart coining of the wafer 10 and to move apart for the loading and unloading of the wafers 10. The dies 66, 68 have facing coining surfaces that are shaped to impart the coined features to the wafer 10 described above. It will be seen that the dies 66, 68 have a series of ridges 70, 72 and pockets 74, 76, respectively. The coining process begins by placing the uncoined preform wafer 10 between the dies 66, 68 as shown in FIG. 6A with the wafer 10 resting on the ridges 72 of the lower die 68 and with the inner diameter surface 14 spaced from an upstanding inner wall 78 of the lower die 68.

Figure 6B:
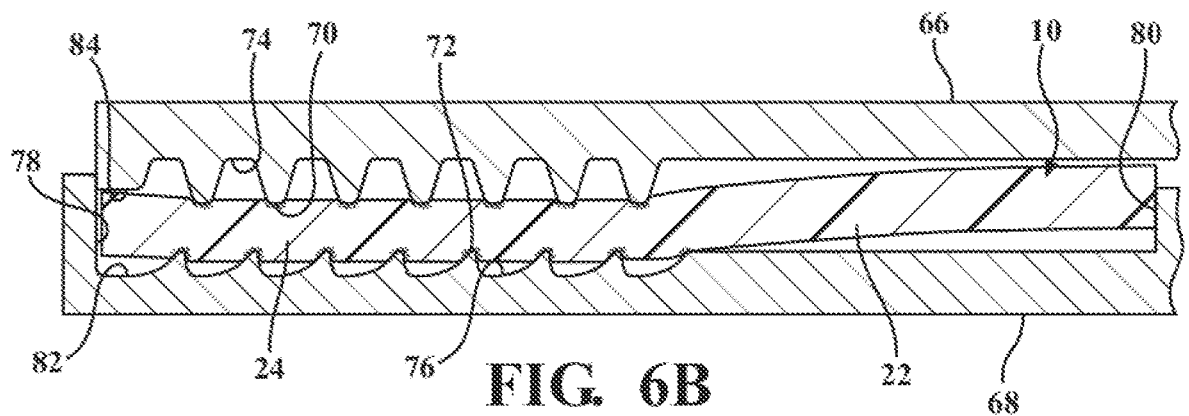

FIG. 6B illustrates initial movement of the dies 66, 68 toward one another, causing the ridges 70, 72 to bite into the opposite sides 18, 20 of the inner portion 24 and to begin squeezing the inner portion 24. This local decrease in cross section of the wafer 10 at the ridges causes the inner portion that will form the eventual coined static seal band 40 to lengthen (i.e., decrease the hole size 16 of the wafer 10) where it confronts the inner wall 78 of the lower die 68 At this point, the wafer 10 is constrained at both its outer 12 and inner 14 surfaces by abutment with respective inner and outer walls 78, 80 of the lower die 68.

Figure 6C:
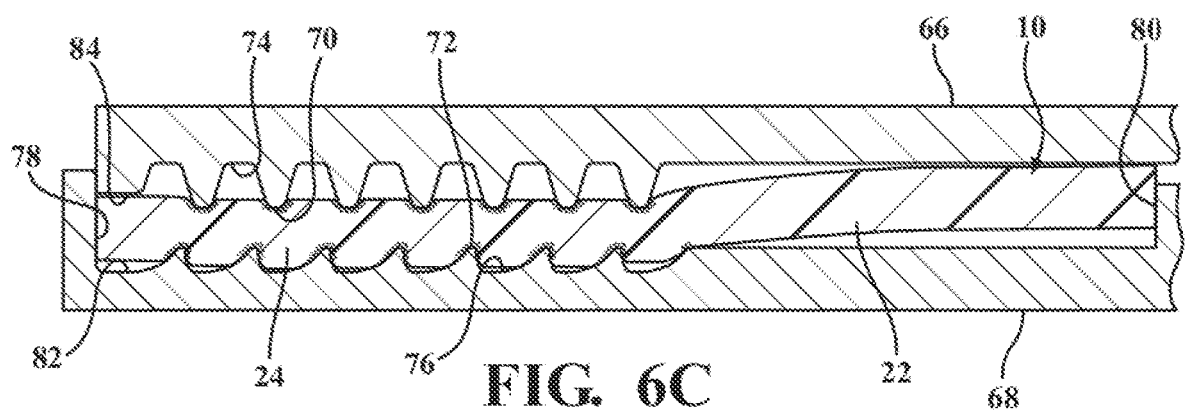

FIG. 6C illustrates the further closing of the die 66, 68, where it can be seen that the penetration of the ridges 70, 72 begins to force displacement of the inner portion 24 of the wafer 10 into the pockets 74, 76 of the dies 66, 68. It can further be seen that static band-forming portion 40 is fully engaged on its outer side 54 by a corresponding wall of the upper die 66, forcibly displacing the opposing inner side 56 into an opposing inner-most pocket 82 of the lower die 68.

Figure 6D:
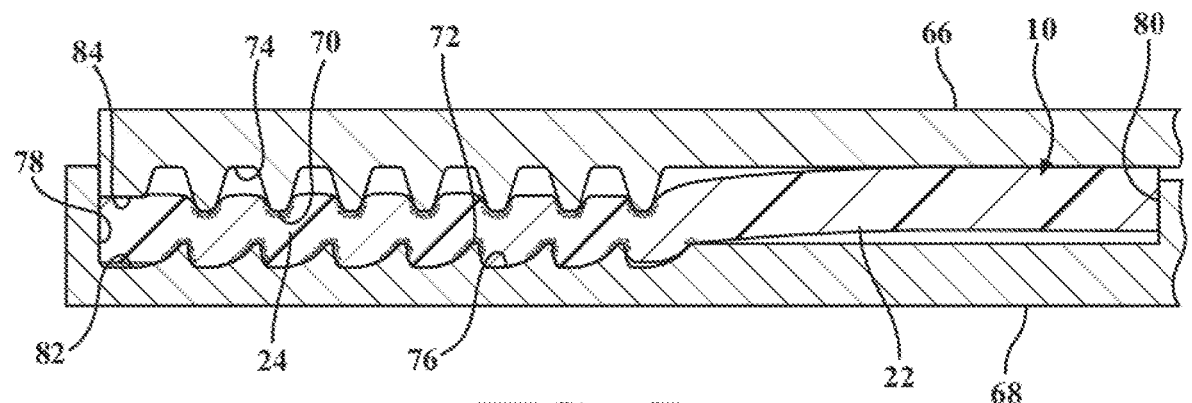
Figure 6E:
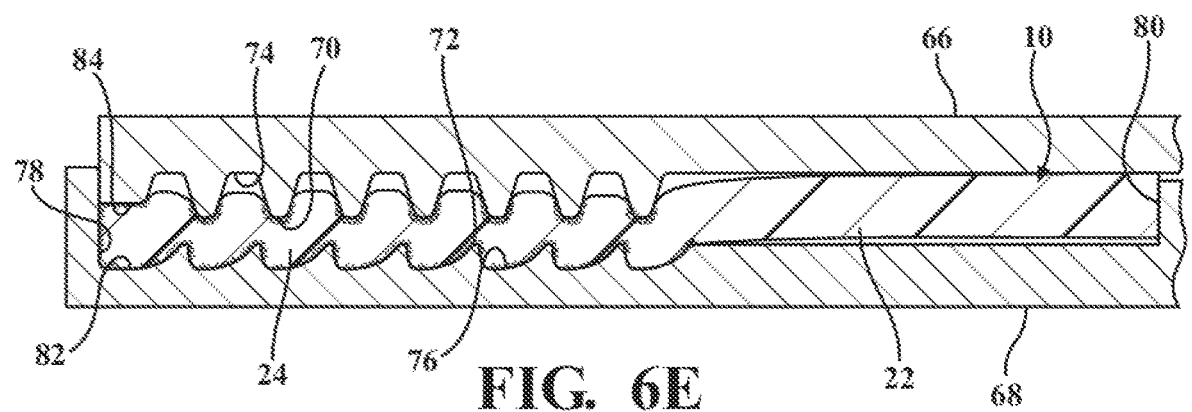

FIGS. 6D and 6E show further step-wise advancement of the coining dies 66, 68 where it can be seen that further displacement of the PTFE material into the pockets 74, 76, 82 continues to take place, with the first pockets 74, 76 becoming completely filled and the end-most pocket 82 and opposing wall 84 being full and compressing the static band forming-portion 40 of the wafer 10 to decrease its thickness to less than the original wafer thickness t1. The end face 46 is also being restrained and coined at this stage. The displaced material from these blocked and filled regions continues to enter the available space of the pockets 74 of the upper die 66.

Figure 6F:
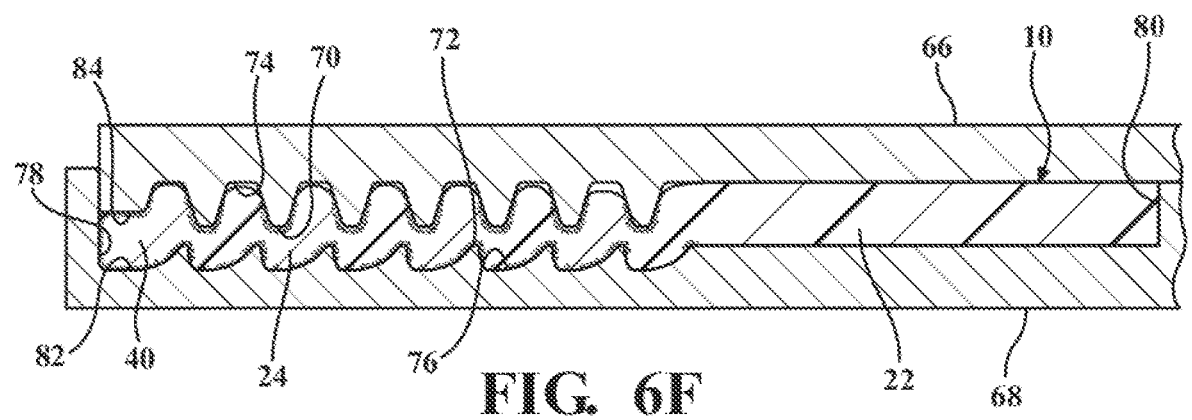

Finally, FIG. 6F shows the coining dies 66, 68 in their fully closed condition, wherein the inner region 24 is fully engaged and compressed by the die surfaces and permanently deformed (coined) at its inner surface 46 and is permanently deformed (coined) at it opposite surfaces 18, 20. Only the very tips of the peaks 38 on the back side 20 are uncoined (i.e., these tips have not been fully engaged and compressed by the surfaces of the dies 66, 68 to permanently deform them, but rather there is excess volume in these associated upper die pockets 75 so just the tips remain uncoined). It is possible to coin the entirety of the inner region 24, including the peak tips 38.

Obviously, many modifications and variations of the present invention are possible in light of the above teachings. It is, therefore, to be understood that the invention may be practiced otherwise than as specifically described while still being within the scope of the invention.

What is claimed is:
1. A PTFE rotary shaft seal assembly, comprising:
an annular seal case mountable within a bore of a housing;

a wafer fabricated of PTFE, the wafer having an outer region captured by the seal case and in inner region extending to a central opening of the wafer;

the wafer including coined fluid pumping impressions formed on a first side of the wafer and coined flexing impressions formed on a second opposite side of the wafer;

wherein the wafer includes a coined static band portion encircling the central opening;

the coined fluid pumping impressions and the coined flexing impressions include a plurality of respective peaks separated by intervening respective valleys;

a portion of the first side of the inner region along the coined static band extending from the central opening and toward the coined fluid pumping impressions is parallel to the first side of the outer region of the wafer when the wafer is in an uninstalled condition;

the portion of the first side of the inner region along the coined static band is permanently displaced below the first side of the outer region of the wafer when the wafer is in the uninstalled condition; and at least some of the peaks of the coined flexing impressions are permanently coplanar with the second side surface of the outer region when the wafer is in the uninstalled condition.

2. The assembly of claim 1, wherein the coined static band portion has a defined maximum coined thickness t2 and the outer region of the wafer inward of the case is uncoined and has an uncoined thickness t1 that is greater than the coined thickness t2 of the coined static band portion.

3. The assembly of claim 2, wherein the inner region of the wafer extends freely inward of the case when the wafer is in the uninstalled condition, and the wafer has an installed condition in which a rotary shaft having a functional outer running surface is extended through the seal assembly causing the opening of the wafer to stretch and for at least some of the coined fluid pumping impressions and the coined static band portion to lie down and engage the running surface of the shaft.

4. The assembly of claim 3, wherein a coined thickness t3 of the inner region as measured between the base of the valleys of the coined fluid pumping impressions and coined flexing impressions is less than the thickness t1 of the uncoined outer region, and less than the thickness t2 of the coined static band portion.

5. The assembly of claim 4, wherein a coined thickness t4 of the inner region as measured between the peaks of the coined fluid pumping impressions and coined flexing impressions is greater than the uncoined thickness t1 of the outer region and greater than the coined thickness t2 of the coined static band portion.

6. The assembly of claim 5, wherein the peaks of the coined fluid pumping impressions are permanently displaced below the first side of the uncoined outer region when the wafer is in the uninstalled condition.

7. The assembly of claim 4, wherein the valleys of the coined fluid pumping impressions all have the same depth.

8. The assembly of claim 4, wherein the valleys of the coined flexing impressions are offset from the valleys of the coined fluid pumping impressions.

9. The assembly of claim 4, wherein the coined static band portion is spaced from the nearest adjacent valley of the coined flexing impressions by an intervening valley of the coined flexing impressions and an intervening peak of the coined flexing impressions.

10. The assembly of claim 4, wherein the valleys of the coined fluid impressions are permanently generally coplanar with the first side surface of the uncoined outer region when the wafer is in the uninstalled condition, and the valleys of the coined flexing impressions are permanently displaced below the second surface of the uncoined outer region when the wafer is in the uninstalled condition.

11. The assembly of claim 1, wherein the peaks of the coined flexing impressions are round.

12. The assembly of claim 9, wherein the intervening peak of the coined flexing impressions is located between the coined static band portion and the intervening valley of the coined fluid pumping impressions.

\* \* \* \* \*